(12) United States Patent
Dong et al.

(10) Patent No.: US 10,678,463 B2
(45) Date of Patent: Jun. 9, 2020

(54) STORAGE MANAGEMENT METHOD, DEVICE AND COMPUTER-READABLE MEDIUM

(71) Applicant: EMC IP Holding Company LLC, Hopkinton, MA (US)

(72) Inventors: Jibing Dong, Beijing (CN); Hongpo Gao, Beijing (CN); Jian Gao, Beijing (CN); Shaoqin Gong, Beijing (CN); Xinlei Xu, Beijing (CN); Ree Sun, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 65 days.

(21) Appl. No.: 15/954,831

(22) Filed: Apr. 17, 2018

(65) Prior Publication Data
US 2018/0300080 A1    Oct. 18, 2018

(30) Foreign Application Priority Data
Apr. 17, 2017   (CN) .......................... 2017 1 0250028

(51) Int. Cl.
*G06F 3/06*   (2006.01)

(52) U.S. Cl.
CPC ............ *G06F 3/0644* (2013.01); *G06F 3/061* (2013.01); *G06F 3/0604* (2013.01); *G06F 3/0619* (2013.01); *G06F 3/0631* (2013.01); *G06F 3/0665* (2013.01); *G06F 3/0689* (2013.01)

(58) Field of Classification Search
CPC combination set(s) only.
See application file for complete search history.

(56) References Cited

U.S. PATENT DOCUMENTS

| | | | |
|---|---|---|---|
| 9,613,053 B1 | 4/2017 | Shusharin et al. | |
| 9,916,312 B1 | 3/2018 | Haase et al. | |
| 10,146,456 B1 | 12/2018 | Gao et al. | |
| 2014/0317340 A1* | 10/2014 | Nishina ................ | G06F 3/0608 711/103 |
| 2017/0153829 A1* | 6/2017 | Patel .................... | G06F 3/0619 |
| 2017/0371579 A1* | 12/2017 | Deiss ................... | G06F 3/0617 |

* cited by examiner

*Primary Examiner* — Masud K Khan
(74) *Attorney, Agent, or Firm* — BainwoodHuang

(57) ABSTRACT

The present disclosure provides a storage management method, a device and a computer-readable medium. The method comprises: receiving a request for creating a storage space, the request at least comprising a storage capacity and a RAID configuration of the storage space, the RAID configuration at least indicating a RAID type; allocating an extent based on the storage capacity; creating a RAID group for the extent based on the RAID type; and storing metadata of the RAID group in the extent, the metadata indicating a configuration of the RAID group and a configuration of a user data region in the extent.

20 Claims, 8 Drawing Sheets

STORAGE MANAGEMENT METHOD, DEVICE AND COMPUTER-READABLE MEDIUM

RELATED APPLICATIONS

This application claim priority from Chinese Patent Application Number CN201710250028.4, filed on Apr. 17, 2017 at the State Intellectual Property Office, China, titled "METHOD, DEVICE AND COMPUTER READABLE MEDIUM OF STORAGE MANAGEMENT" the contents of which is herein incorporated by reference in its entirety.

FIELD

Embodiments of the present disclosure relate to the field of data storage, and more specifically, to a storage management method, a storage system and a computer program product.

BACKGROUND

Redundant Array of Independent Disks (RAID) is a hard disk group (logic hard disk) formed by combining multiple independent hard disks (physical hard disks) in different manners, thereby providing a better storage performance than that of an individual hard disk and providing data backup technology.

When a user needs a storage space, he/she may apply to a server or a storage space management system to obtain a storage space with a corresponding capacity. Specifically, when the user applies to create a storage space, a disk region of a corresponding size is divided from a group of fixed disks as the storage space requested by the user; a RAID group is created based on the divided disk region, and this portion of disk region is divided into multiple blocks (e.g., 1 MB for each block), wherein metadata for describing a state of each block is stored at the end of this portion of disk region, and information for describing RAID configuration is stored in the storage space of the memory.

However, when the storage space is created in the above manner, all I/O operations for the created storage space need to access or update the stored metadata. Thus, the storage manner of metadata will become a bottleneck of the whole mapped RAID traffic. For example, when the disk storing metadata is damaged, it is certain to fail the whole RAID mapping, thereby resulting in reduced reliability of data storage; in addition, the user cannot expand or reduce the size of the storage space on the basis of the storage space that has already been applied for.

SUMMARY

Embodiments of the present disclosure provide a storage management method, a device and a computer-readable medium.

According to a first aspect of the present disclosure, it provides a storage management method, comprising: receiving a request for creating a storage space, the request at least comprising a storage capacity and a RAID configuration of the storage space, the RAID configuration at least indicating a RAID type; allocating an extent based on the storage capacity; creating a RAID group for the extent based on the RAID type; and storing metadata of the RAID group in the extent, the metadata indicating the RAID configuration and a configuration of a user data region in the extent.

According to a second aspect of the present disclosure, it provides a device. The device comprises: at least one processing unit; at least one memory which is coupled to the at least one processing unit and stores instructions executed by the at least one processing unit, the instructions, when executed by the at least one processing unit, enabling the device to perform actions. The actions comprise: receiving a request for creating a storage space, the request at least including a storage capacity and a RAID configuration of the storage space, the RAID configuration at least indicating a RAID type; allocating an extent based on the storage capacity; creating a RAID group for the extent based on the RAID type; and storing metadata of the RAID group in the extent, the metadata indicating the RAID configuration and a configuration of a user data region in the extent.

According to a third aspect of the present disclosure, it provides a computer-readable storage medium which has computer-readable program instructions stored thereon, the computer-readable program instructions, when being executed by a processing unit, enabling the processing unit to implement the method according to any of claims 1-10.

This Summary is provided to introduce in a simplified form a selection of concepts that will be further described in Detailed Description below. This Summary is not intended to identify key features or essential features of the present disclosure nor limit the scope of the present disclosure.

BRIEF DESCRIPTION OF THE DRAWINGS

The above and other objectives, features, and advantages of exemplary embodiments of the present disclosure will become more apparent from the following Detailed Description in conjunction with the accompanying drawings, wherein like numbers reference like components in the exemplary embodiments of the present disclosure.

DETAILED DESCRIPTION

Figure 1:
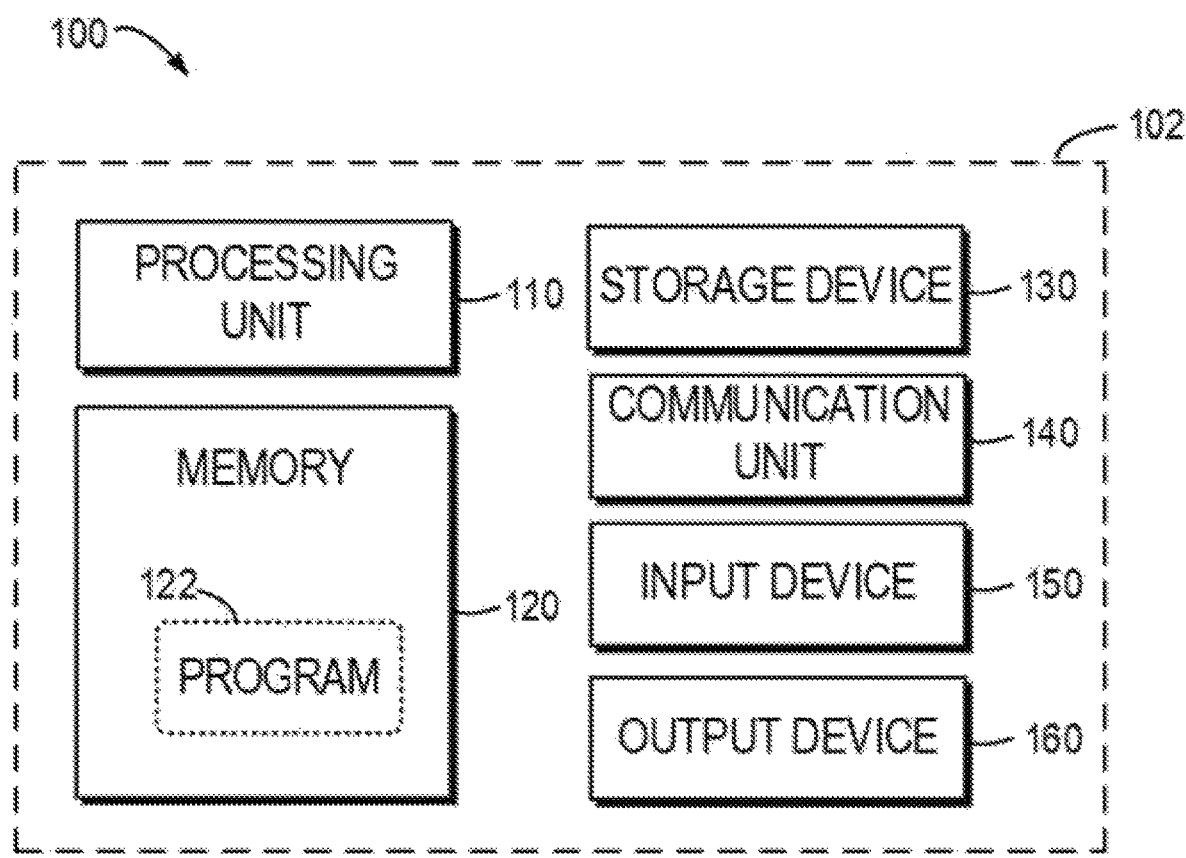
FIG. 1 illustrates a block diagram of a computing environment 100 in which embodiments of the present disclosure can be implemented.

Preferred embodiments of the present disclosure will be described as follows in greater detail with reference to the drawings. Although preferred embodiments of the present disclosure are illustrated in the drawings, it is to be understood that the present disclosure described herein can be implemented in various manners, and should not be limited to the embodiments illustrated herein. Rather, these embodiments are provided to make the present disclosure described herein clearer and more complete, and convey the scope of the present disclosure described herein completely to those skilled in the art.

As used herein, the term "include" and its variants are to be read as open-ended terms that mean "include, but is not limited to." The term "or" is to be read as "and/or" unless the context clearly indicates otherwise. The term "based on" is to be read as "based at least in part on." The term "one exemplary embodiment" and "an exemplary embodiment" are to be read as "at least one exemplary embodiment." The term "another embodiment" is to be read as "at least one other embodiment." Terms "a first", "a second" and others can denote different or identical objects. The following text may also contain other explicit or implicit definitions.

As stated above, regarding the storage manner of metadata, if the metadata is stored in a centralized storage manner, the mapping of the whole RAID group and the storage space will fail once the extent for storing the metadata is damaged, resulting in a lower mapping reliability. In addition, the centralized storage manner of the metadata further causes the storage space already allocated to the user not to be expanded or reduced, and in turn leads to a lower efficiency of storage management in that the storage space in the storage system cannot be effectively used.

In embodiments of the present disclosure, the term "extent" refers to a storage space which has a predetermined capacity and is divided from a storage medium such as a hard disk, a magnetic disk, an optical disk or a solid-state drive (SSD). A "storage space" allocated based on a request to create a storage space refers to a storage space formed by a plurality of extents for the user to store data, run a program or the like.

In order to at least partially solve the problems above and other potential problems, an exemplary embodiment of the present disclosure provides a solution of executing storage management in a storage system. In the solution, a storage device is divided into a plurality of extents; when a request for creating a storage space is received, a corresponding number of extents are allocated based on a storage capacity of the requested storage space; each allocated extent retains a portion of storage space for storing metadata. That is, each extent has its own metadata storing region. Hence, when any extent is damaged, it is only necessary to replace the damaged extent without affecting the mapping between other extents and the RAID group, thereby increasing the mapping reliability.

Basic principles and various exemplary embodiments of the present disclosure will now be described with reference to the drawings. FIG. 1 illustrates a block diagram of a computing environment 100 in which embodiments of the present disclosure can be implemented. It would be appreciated that the computing environment 100 described in FIG. 1 is merely for illustration and does not limit the function and scope of implementations of the present disclosure in any manners.

As shown in FIG. 1, the computing environment 100 includes a computing system/server 102 in the form of a general computer device. The computing system/server 102 can be used to implement storage management according to embodiments of the present disclosure. The computing system/server 102 may receive requests of creating, expanding or reducing a storage space and respond to these requests. Components of the computing system/server 102 include, but are not limited to, one or more processors or processing units 110, a memory 120, a storage device 130, one or more communication units 140, one or more input devices 150, and one or more output devices 160. A processing unit 110 can be a physical or virtual processor and can execute various processes based on the programs stored in the memory 120. In a multi-processor system, multiple processing units execute computer-executable instructions in parallel to improve the parallel processing capability of the computing system/server 102.

The computing system/server 102 typically includes a plurality of computer storage media, which can be any available media accessible by the computing system/server 102, including but not limited to volatile and non-volatile media, and removable and non-removable media. The memory 120 can be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof. The memory 120 may include one or more program products 122 having one or more sets of program modules configured to perform functions of various implementations described herein.

The storage device 130 can be any removable or non-removable media and may include machine-readable media, such as internal storage, flash drive, disks, and any other media, which can be used for storing information and/or data and accessed within the computing system/server 102.

The computing system/server 102 may further include additional removable/non-removable, volatile/non-volatile memory media. Although not shown in FIG. 1, a disk drive is provided for reading and writing a removable and non-volatile disk and an optical disk drive is provided for reading and writing a removable and non-volatile optical disk. In such case, each drive is connected to a bus (not shown) via one or more data media interfaces.

The communication unit 140 enables communications with a further computing device via communication media. Additionally, functions of components in the computing system/server 102 can be implemented by a single computing cluster or multiple computing machines connected communicatively for communication. Therefore, the computing system/server 102 can be operated in a networking environment using a logical link with one or more other servers, network personal computers (PCs) or another general network node.

The input device 150 may include one or more input devices, such as a mouse, a keyboard, a tracking ball, a voice-input device, and the like. The output device 160 may include one or more output devices, such as a display, a loudspeaker, a printer, and the like. The computing system/server 102 can also communicate via the communication unit 140 as needed with one or more external devices (not shown) such as a storage device, a display device and the like, one or more devices that enable users to interact with the computing system/server 102, or any devices that enable the computing system/server 102 to communicate with one or more other computing devices (for example, a network card, modem, and the like). Such communication is performed via an input/output (I/O) interface (not shown).

As shown in FIG. 1, the storage device 130 may be divided into a plurality of extents which are added to an extent pool so that an extent is allocated from the extent pool to the user when a storage space creating request is received. A storage capacity of each extent may be 1 MB or 1 GB. It should be appreciated that the storage capacity of each extent may be any value. The above storage capacity is only exemplary and not intended to limit the scope of the present disclosure.

Figure 2:
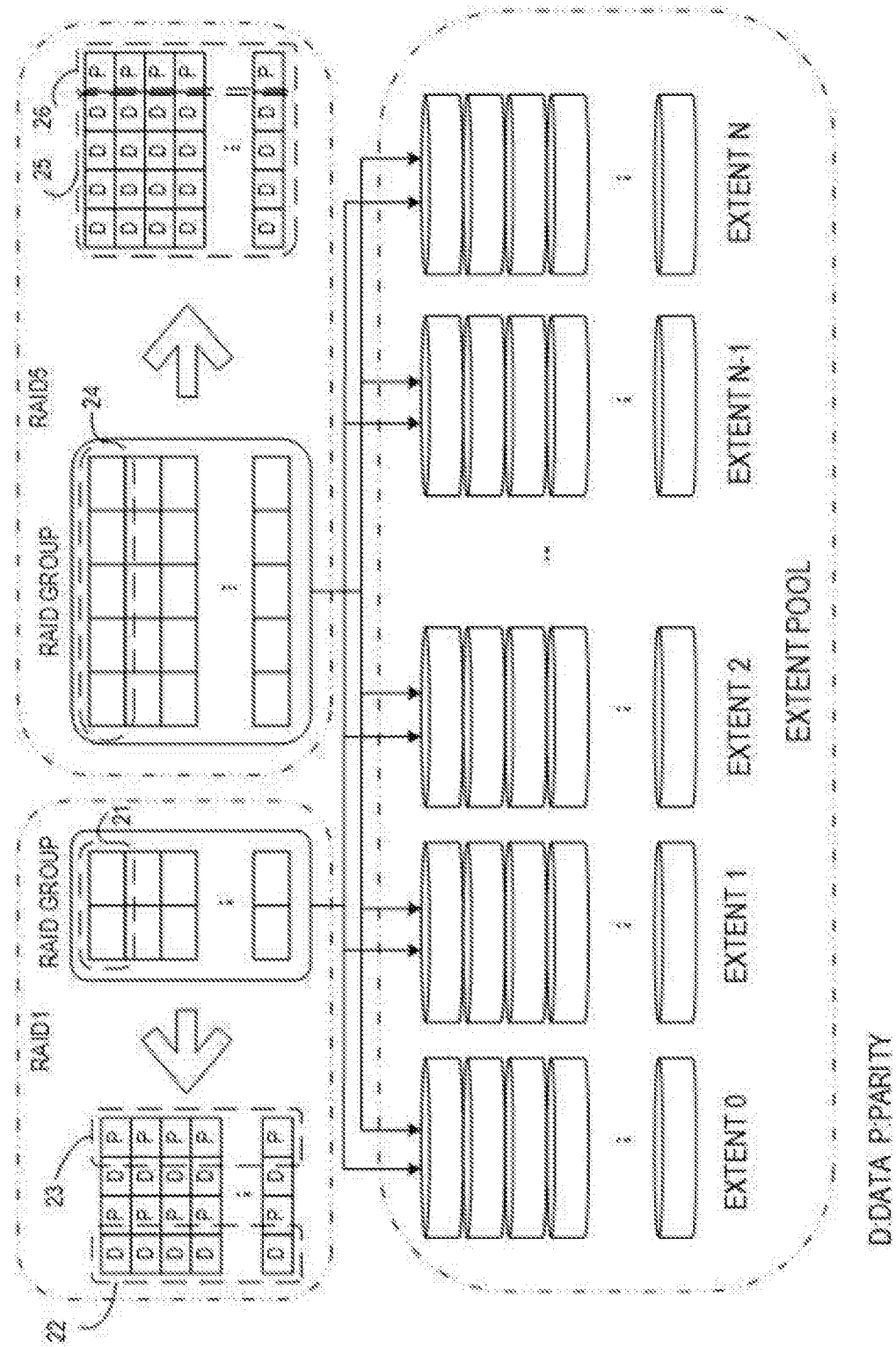
FIG. 2 illustrates an extent pool and a mapping relationship between the extent pool and a RAID group.

Implementations of the present disclosure are further described through specific examples. FIG. 2 illustrates an extent pool and a mapping relationship between extents and a RAID group. In some embodiments, the storage 130 is pooled into an extent pool.

The example shown in FIG. 2 shows mapping relationship between extents and two RAID types of RAID groups, including RAID groups of RAID 1 type and RAID 5 type. Each RAID group includes a plurality of RAID units. Each RAID unit maps a plurality of disk extends, and the number of mapped extents depends on the RAID type. It should be understood that the above RAID types are only exemplary and not intended to limit the scope of the present disclosure.

Regarding the RAID group of RAID 1 type, each RAID unit 21 in the RAID group maps two extents: extent 22 is used to store data information, and extent 23 is used to mirror data information, as check information. It is to be noted that two extents mapped by one RAID group of RAID 1 type come from different disks to ensure data safety, and avoid data loss caused by damages of one disk.

Regarding the RAID group of RAID 5 type, each RAID unit 24 in the RAID group maps five extents: extent 25 is used to store data information, and extent 26 is used to store check information so that when any one disk in four extents storing data information is damaged, it is still possible to restore data on the damaged disk according to the check information, thereby ensuring data safety. In addition, the extents mapped by one RAID group of RAID 5 type come from five different disks.

It should be appreciated that the RAID types of RAID groups mapped by extents are not limited to the two types shown in FIG. 2, and they may include other RAID types such as RAID 2, RAID 3, RAID 4, RAID 6 and the like and are not intended to limit the scope of the present disclosure.

Figure 3:
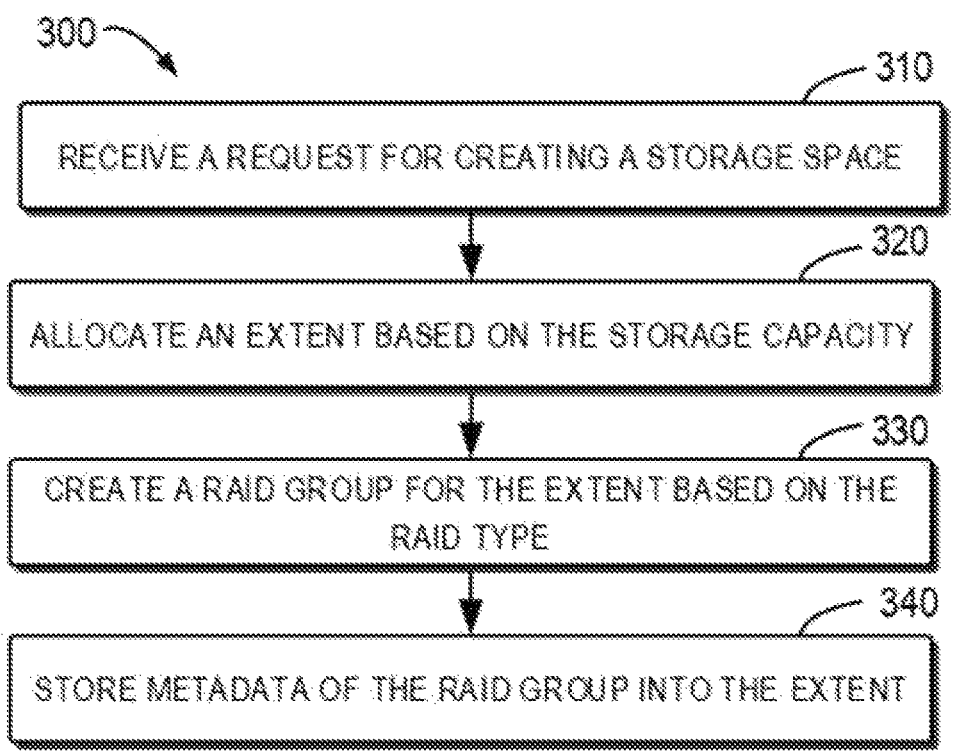
FIG. 3 illustrates a flow chart of a process 300 of creating a storage space in accordance with an exemplary embodiment of the present disclosure.

FIG. 3 illustrates a flow chart of a process 300 of creating a storage space in accordance with an exemplary embodiment of the present disclosure. The process 300 for example may be implemented in the computing system/server 102.

At 310, a request for creating a storage space is received. The request at least includes a storage capacity and a RAID configuration of the storage space. The RAID configuration at least indicates a RAID type. The request for creating the storage space is sent by a user device which applies for the storage space. The request sending manner may be loading an application webpage of the storage space on the user device. The user defines, on the webpage, information such as the storage capacity and the RAID configuration of the applied storage space, and sends the request to the computing system/server 102, so that the computing system/server 102 can create the storage space for the user according to the request after receiving the request.

At 320, extents are allocated based on the storage capacity. Specifically, the number of desired extents is calculated based on the storage capacity and the storage capacity of each extent; according to the desired number of extents, a corresponding number of extents are allocated from the extent pool to create the storage space. The extent pool includes a plurality of extents divided from a plurality of storage media, and the storage capacity of each extent is the same.

In some embodiments, dynamic mapping is maintained. The dynamic mapping includes at least one of the following: a first multi-tuple comprising identification information of the storage space, a storage capacity of the storage space, a RAID configuration and reference information of the storage space, the reference information being used to indicate a logic block address corresponding to the storage space; a second multi-tuple comprising a mapping relationship between a logic unit number (LUN) of the storage space and an address of the RAID group, and the second multi-tuple comprising at least one sub-multi-tuple of the same size; a third multi-tuple comprising a mapping relationship between the RAID group of the storage space and the extent.

The identification information of the storage space is used to uniquely identify a corresponding storage space. The first multi-tuple comprises the identification information of the storage space, the storage capacity of the storage space, the RAID configuration and the reference information of the storage space. The RAID configuration may comprise the number of extents of the RAID group and information related to extent performance. The present disclosure does not limit specific information included by the RAID configuration.

Figure 4:
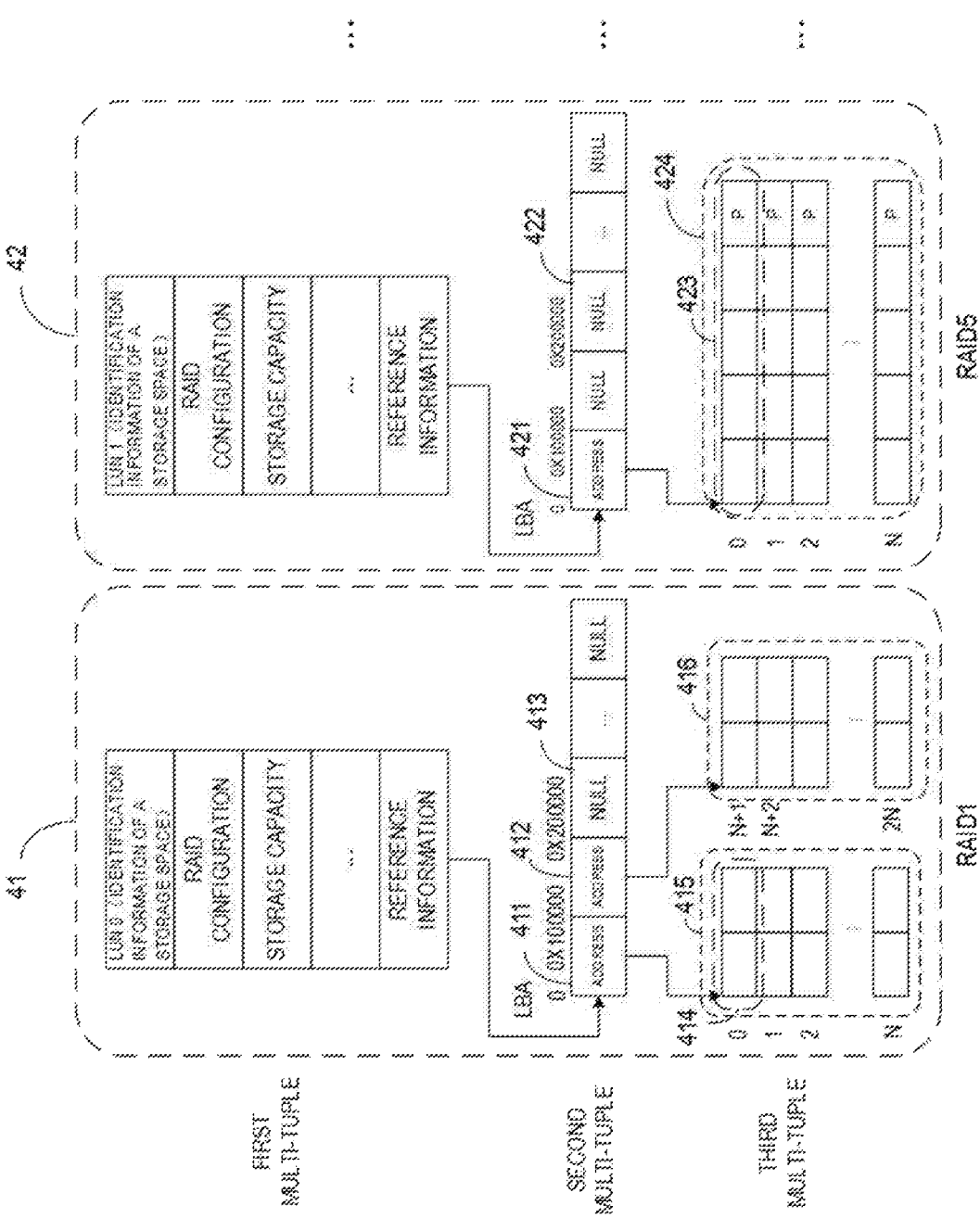
FIG. 4 illustrates a schematic diagram of dynamic mapping in accordance with an exemplary embodiment of the present disclosure.

FIG. 4 illustrates a schematic diagram of dynamic mapping in accordance with an exemplary embodiment of the present disclosure. In FIG. 4, the RAID type of the RAID group in the third multi-tuple is RAID 2 in the dynamic mapping 41 corresponding to the storage space with the identification information LUN 0; the RAID type of the RAID group in the third multi-tuple is RAID 5 in the dynamic mapping 42 corresponding to the storage space LUN 1.

According to the dynamic mapping, when data read/write operations are executed, it is possible to address the second multi-tuple according to the reference information stored in the first multi-tuple, determine a storage position of the RAID group according to the address of the RAID group stored in the second multi-tuple, and write data to the extent or read data from the extent according to the extent mapped by the RAID group.

In some embodiments, before the extent is allocated based on the storage capacity, dynamic mapping corresponding to the storage space to be created is initialized. Specifically, information such as the identification information of the storage space, the storage capacity of the storage space, the RAID configuration and the reference information of the storage space is stored in the first multi-tuple based on the request received in 310; the second multi-tuple is initialized as empty; and the storage space is allocated for the third multi-tuple from the memory.

By maintaining the dynamic mapping, it is possible to implement more effective management for the created storage space, and manage better the mapping relationship between the RAID group to be created and the extent, thereby ensuring a high speed of data read/write and safety of data storage when the user uses the created storage space to store data.

In some embodiments, before the extent is allocated, it is detected whether an idle storage unit is present in the second multi-tuple for storing the address of the RAID group; if the idle storage unit does not exist in the second multi-tuple, a sub-multi-tuple is allocated, the sub-multi-tuple comprising a plurality of idle storage units; the sub-multi-tuple is arranged at an end of the second multi-tuple.

As shown in FIG. 4, in the dynamic mapping 41 that the RAID type is RAID 2, a storage unit 411 of the second multi-tuple is used to store an address of the RAID group corresponding to LUN which is 0-0x100000, a storage unit 412 is used to store an address of the RAID group corresponding to LUN which is 0-0x200000, and a storage unit 413 is an idle storage unit.

At 330, the RAID group is created for the extent based on the RAID type.

The number of extents mapped by each RAID group is related to the RAID type. When the RAID type is RAID 1, each RAID group maps two extents, and the two extents mapped by each RAID group come from two different disks. Accordingly, when the RAID type is RAID 5, each RAID group maps five extents, and the five extents mapped by each RAID group come from different disks respectively. When the RAID type is from other types, a similar method is employed to create a RAID group for the allocated extent.

In some embodiments, after the RAID group is created for the extent based on the RAID type, an extent position of each extent mapped by each RAID unit in the RAID group and a disk state of the disk where the each extent locates are stored in the third multi-tuple of the dynamic mapping. The extent position may comprise a disk index and a starting LBA of the extent in the disk, and it may also be other information capable of representing an extent position, for example an extent index. The present disclosure does not limit this aspect specifically. The disk state is used to indicate whether the disk where the extent locates has already been damaged and/or has already been filled with data.

As shown in FIG. 4, the third multi-tuple in the dynamic mapping 41 may be used to store extent configuration information of each extent mapped by each RAID unit in the RAID group, for example, extent positions of two extents mapped by the RAID unit 414 in the RAID group and the disk state of the disk where the extents locate are stored in corresponding storage units respectively.

In some embodiments, after the RAID group is created for the disk region based on the RAID type, the address of the created RAID group is stored in an idle storage unit of the second multi-tuple of the dynamic mapping. For example, in FIG. 4, the address of RAID group 415 numbered as 0~n in the dynamic mapping 41 may be stored in the storage unit 411 corresponding to LUN 0~0x100000, and the address of RAID group 416 numbered as n+1~2n may be stored in the storage unit 412 corresponding to LUN 0x100000~0x200000. Accordingly, the address of RAID group 424 in the dynamic mapping 42 may be stored in a storage unit 421 in the second multi-tuple. It should be appreciated that the above content is only exemplary and not intended to limit the scope of the present disclosure.

At 340, metadata of the RAID group is stored in the extent, and the metadata indicates the RAID configuration and attributes of a user data region in the extent.

The metadata comprises first metadata used to record configuration information of the RAID units in the RAID group, the RAID group comprising a plurality of RAID units, and second metadata used to record whether a data block in the user data region is used to replace an already-damaged data block. Each RAID unit maps a plurality of extents. It needs to be appreciated that the number of extents mapped by each RAID unit depends on the RAID type of the RAID group. For example, when the RAID type is RAID 1, each RAID unit maps two extents; when the RAID type is RAID 5, each RAID unit maps five extents. It should be appreciated that the above content is only exemplary and not intended to limit the scope of the present disclosure.

For any RAID unit in the RAID group, the configuration information of the RAID unit recorded by the first metadata corresponding to the RAID unit comprises: tag information, identification information of the storage space, identification information of the RAID group, RAID type, width information, extent size, extent identification information and extent position information. Meanings of each configuration are shown in Table 1.

TABLE 1

| Configuration information | Meaning |
|---|---|
| Tag information (Header) | Identify that the type of the data is the first metadata |
| Identification information of storage space (LUN ID) | Uniquely identify a corresponding storage space |
| Identification information of RAID group (RAID ID) | Correspond to LUN ID (one-to-one), and identify a RAID group of the corresponding storage space |
| RAID type | Consistent with the RAID type in the RAID configuration |
| Width information (Width) | Number of extents mapped by each RAID unit |
| Extent size | A storage capacity of an extent |
| Extent identification information (extent ID) | Indicate a position of an extent in a RAID unit |
| Extent information (extent info) | Extent position information and disk state information |

The tag information of the first metadata may be a specific character string. For any data, if it is detected that the data includes the specific character string, the data is determined as the first metadata. In addition, a specific bit in the specific character string may be a valid bit; for example, when the valid bit is 1, the first metadata is determined as valid; when the valid bit is 0, the first metadata is determined as invalid. In the extent information included by the first metadata, the extent position information may include a disk index and an extent index. It should be appreciated that the above content is only exemplary and not intended to limit the scope of the present disclosure. That is, in addition to the configuration information listed in Table 1, the first metadata may further include other information, which will not be limited by the present disclosure.

The second metadata for recording configurations of the user data region comprises a valid bit, a bit mask and a verification bit. The meanings of each configuration are shown in Table 2.

TABLE 2

| Name | Meaning |
|---|---|
| Valid Bit | Indicate whether the second metadata is valid |
| RL bitmask | Indicate which extent in extents mapped by the RAID unit needs to be rebuilt |
| Verify bits | Indicate which type of verification needs to be executed in the RAID unit |

In some embodiments, a method of storing the metadata of the RAID group in the extent includes: storing the first metadata in a mirror stripe created for the extent, the mirror stripe being stored at the start of the extent; storing the second metadata at an end of the extent, a region between the start and the end of the extent being the user data region. That is, the first metadata is stored in a mirror manner, and the first metadata is stored at the start of each extent. The second metadata stored at the end of the extent employs the same algorithm as the user data region to perform operations such as data read/write. Storing the metadata in each extent mapped by the RAID group can not only achieve the resizing of the storage space, but also improve the I/O performance of the metadata.

Figure 5:
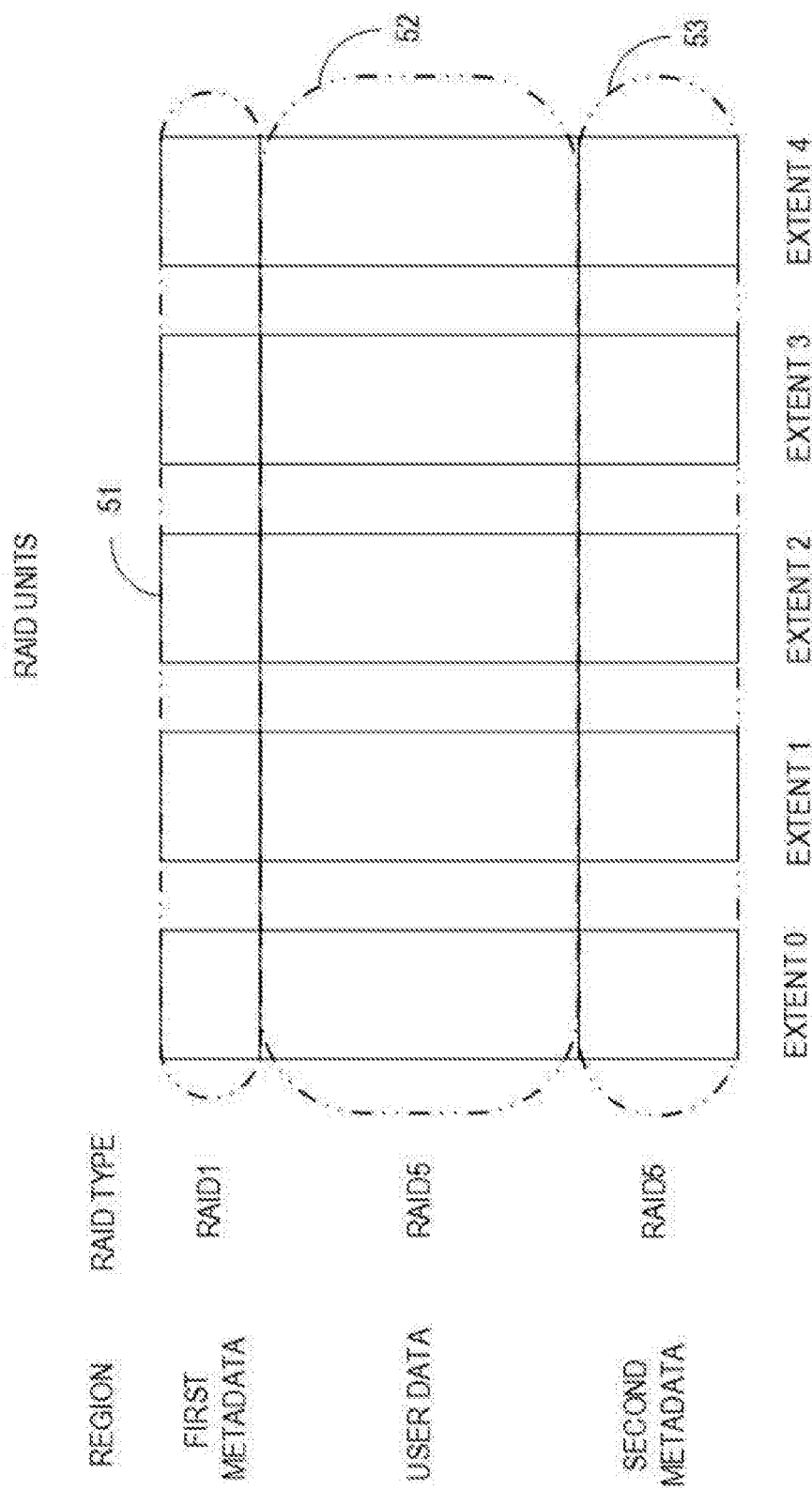
FIG. 5 illustrates a schematic diagram of a mapping relationship between a RAID unit in a RAID group with a RAID type RAID 5 and an extent in accordance with an exemplary embodiment of the present disclosure.

FIG. 5 illustrates a schematic diagram of a mapping relationship between a RAID unit in a RAID group of a RAID type RAID 5 and an extent in accordance with an exemplary embodiment of the present disclosure. The start of the five extents is a mirror stripe, used as a first metadata storage region 51; the end of the five extents is a second metadata storage region 53; a user data region 52 is between the start and the end. The second metadata storage region 53 at the end and the user data region 52 both employ RAID 5 algorithm to perform operations such as data read/write.

In some embodiments, the first metadata and the second metadata stored in each extent comprise all or partial information stored in the dynamic mapping so that the dynamic mapping is obtained or inferred based on the first metadata and second metadata. In this way, when the dynamic mapping is stored in the memory, it is possible to re-obtain the dynamic mapping based on the metadata stored in each extent if the power failure occurs or the system malfunctions, thereby ensuring reliability of the mapping and the data storage.

Figure 6:
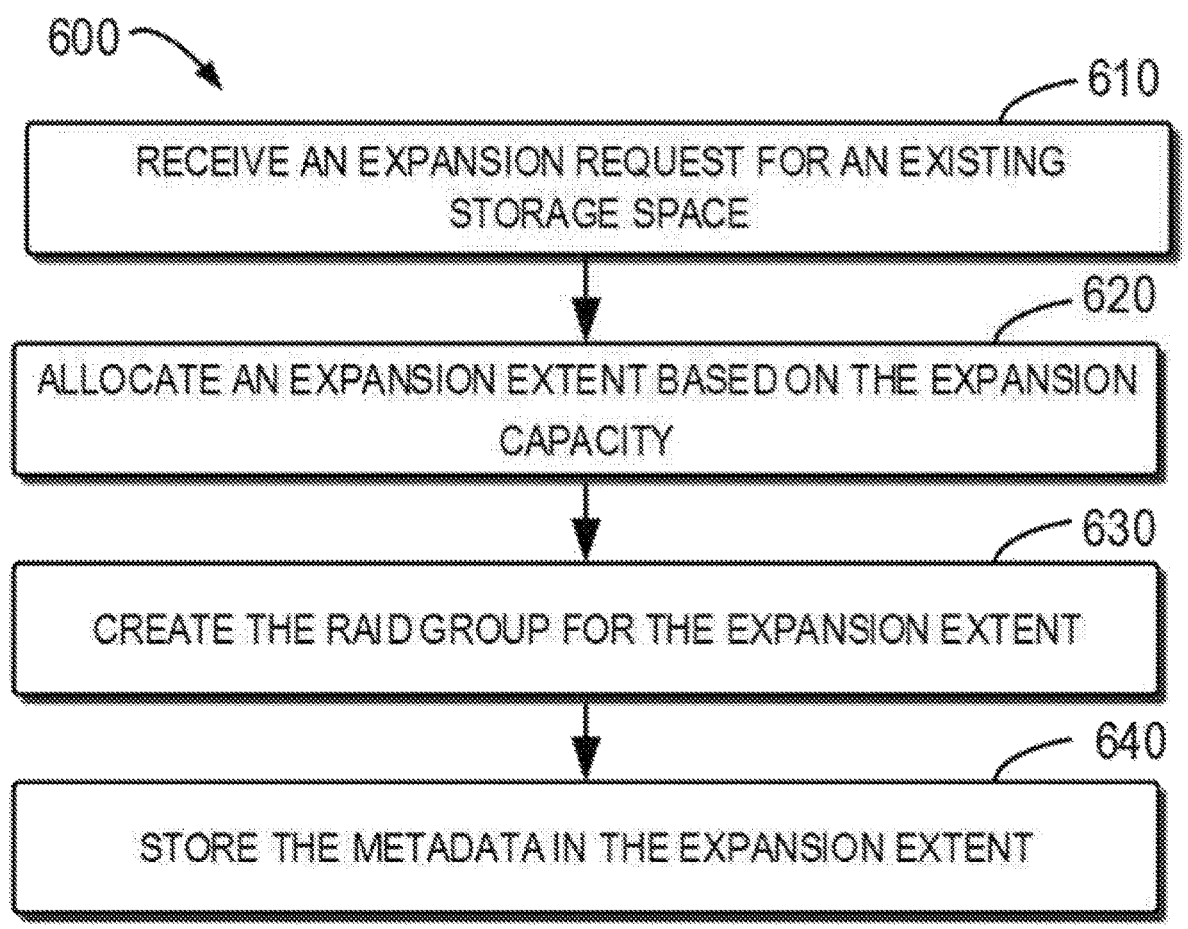
FIG. 6 illustrates a flow chart of a process 600 of expanding a storage space in accordance with an exemplary embodiment of the present disclosure.

FIG. 6 illustrates a flow chart of a process 600 of expanding a storage space in accordance with an exemplary embodiment of the present disclosure. The expanded storage space is a storage space created based on the method shown in FIG. 3. The process 600 may be implemented in the computing system/server 102.

At 610, an expansion request for an existing storage space is received, the expansion request including identification information and expansion capacity of the existing storage space (the storage space to be expanded).

At 620, an expansion extent is allocated for the existing storage space based on the expansion capacity. A specific allocating method is similar to the extent allocating method in step 320, and thus will not be detailed here.

In some embodiments, before the expansion extent is allocated, the dynamic mapping is detected to determine whether the second multi-tuple corresponding to the existing storage space includes an idle storage unit for storing the address of the RAID group; if the second multi-tuple does not include the idle storage unit, a sub-multi-tuple is allocated, the sub-multi-tuple comprising a plurality of idle storage units; the sub-multi-tuple is placed at the end of the second multi-tuple to store the address of the newly-created expansion RAID group in the idle storage space of the second multi-tuple.

At 630, the expansion RAID group is created for the expansion extent based on the RAID type of the existing storage space. Specifically, according to identification information of the existing storage space, it is possible to obtain the RAID type from the first multi-tuple corresponding to the existing storage space in the dynamic mapping, or to obtain the RAID type from a mirror stripe of any extent of the existing storage space, in order to create the expansion RAID group for the expansion extent based on the RAID type. It needs to be noted that similar to step 330, after the expansion RAID group is created, an extent state and an extent position of the expansion extent mapped by each expansion RAID group are stored in the third multi-tuple corresponding to the existing storage space in the dynamic mapping.

At 640, the metadata is stored in the expansion extent. A specific metadata storing method is similar to the metadata storing method in step 330 and thus will not be detailed here. It is appreciated that after the metadata is stored in the expansion extent, information in the first multi-tuple corresponding to the existing storage space in the dynamic mapping is updated, including storage capacity and the like.

Figure 7:
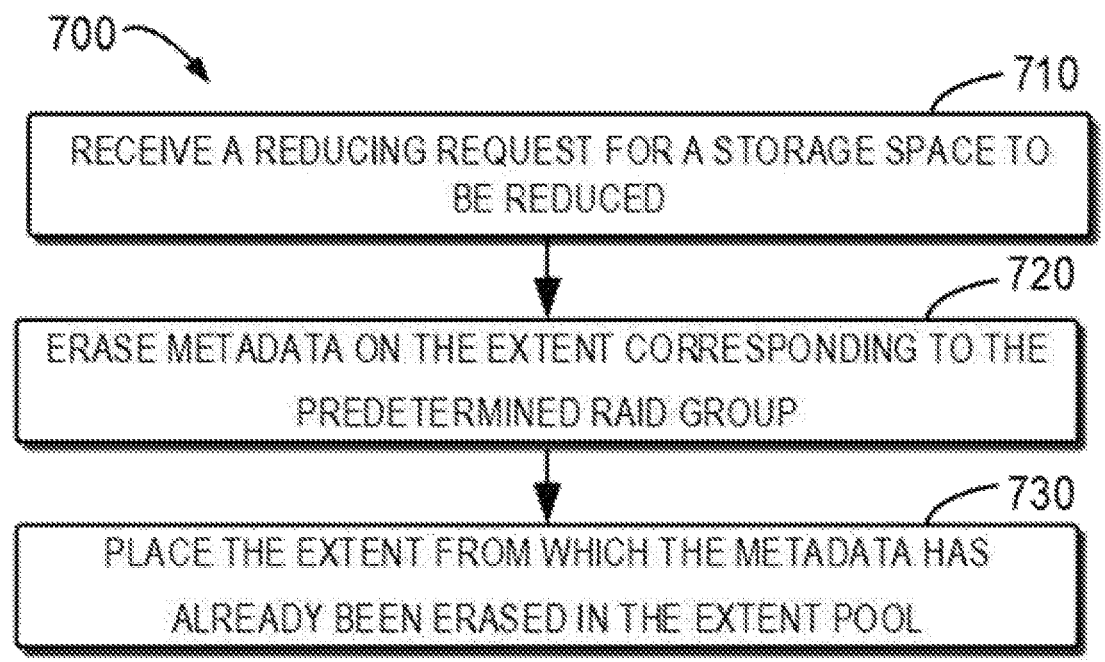
FIG. 7 illustrates a flow chart of a process 700 of reducing a storage space in accordance with an exemplary embodiment of the present disclosure.

FIG. 7 illustrates a flow chart of a process 700 of reducing a storage space in accordance with an exemplary embodiment of the present disclosure. The reduced storage space is the storage space created based on the method shown in FIG. 3. The process 700 may be implemented in the computing system/server 102.

At 710, a reducing request for reducing a storage space to be reduced is received. The reducing request includes indication information which is used to indicate a predetermined RAID group to be reduced. The indication information may include identification information and a reducing capacity of the storage space to be reduced, and the predetermined RAID group is determined according to the storage space to be reduced and the reducing capacity. When the storage capacity of the predetermined storage space requested by the user exceeds that of the user's anticipated need, or when the user does not need the data stored in the predetermined storage space, the predetermined storage space may be reduced and the redundant storage space, namely, extents, is placed in the extent pool. In this way, the utilization rate of the storage medium is improved as the extents is re-allocable upon other users' needs, and extents divided from the storage medium can be used sufficiently.

At 720, metadata on the extent corresponding to the predetermined RAID group is erased according to the indication information. Specifically, according to the indication information, it is possible to look up the dynamic mapping for the extent mapped by the predetermined RAID group, and then perform the erasing operation. In some embodiments, when the metadata is erased, only the first metadata, namely, metadata for recording RAID configuration, may be erased to improve the data erasing rate and thus improve the reducing rate of the storage space; the first metadata and second metadata may be erased at the same time.

In some embodiments, before the metadata is erased, the third multi-tuple corresponding to the predetermined RAID group in the dynamic mapping is marked as invalid to make the predetermined RAID group invalid. That is, the mapping relationship between the predetermined RAID group and the corresponding extent in the third multi-tuple is released to make the data read/write operations of the corresponding extent invalid.

Through the marking of invalidity, it can be ensured that read/write operations cannot be performed for the data in the extent corresponding to the predetermined RAID group any longer during the reducing of the storage space, thereby improving safety and stability of data storage.

At 730, the extent from which the metadata has already been erased is placed in the extent pool. All mapping relationships of the extent from which the metadata has already been erased are released, or the extent is marked idle to return to the extent pool. The extent is initialized upon re-allocation, and data stored thereon is completely erased. The extent is re-combined with other extents to form a new storage space or serve as an expansion storage space of the storage space to be expanded.

In some embodiments, the storage unit which is in the second multi-tuple of the dynamic mapping and originally used to store the address of the predetermined RAID group is marked as idle. That is, the mapping relationship between the LUN in the second multi-tuple and the RAID group is released. If all storage units in the predetermined sub-multi-tuple where the predetermined storage unit locates are all marked as idle, the corresponding relationship of the predetermined sub-multi-tuple and the second multi-tuple is released so that the storage space in the memory occupied by the predetermined sub-multi-tuple may be used to store other data. The utilization rate of the storage space in the memory can be improved by releasing the storage space in the memory occupied by the sub-multi-tuple.

Figure 8:
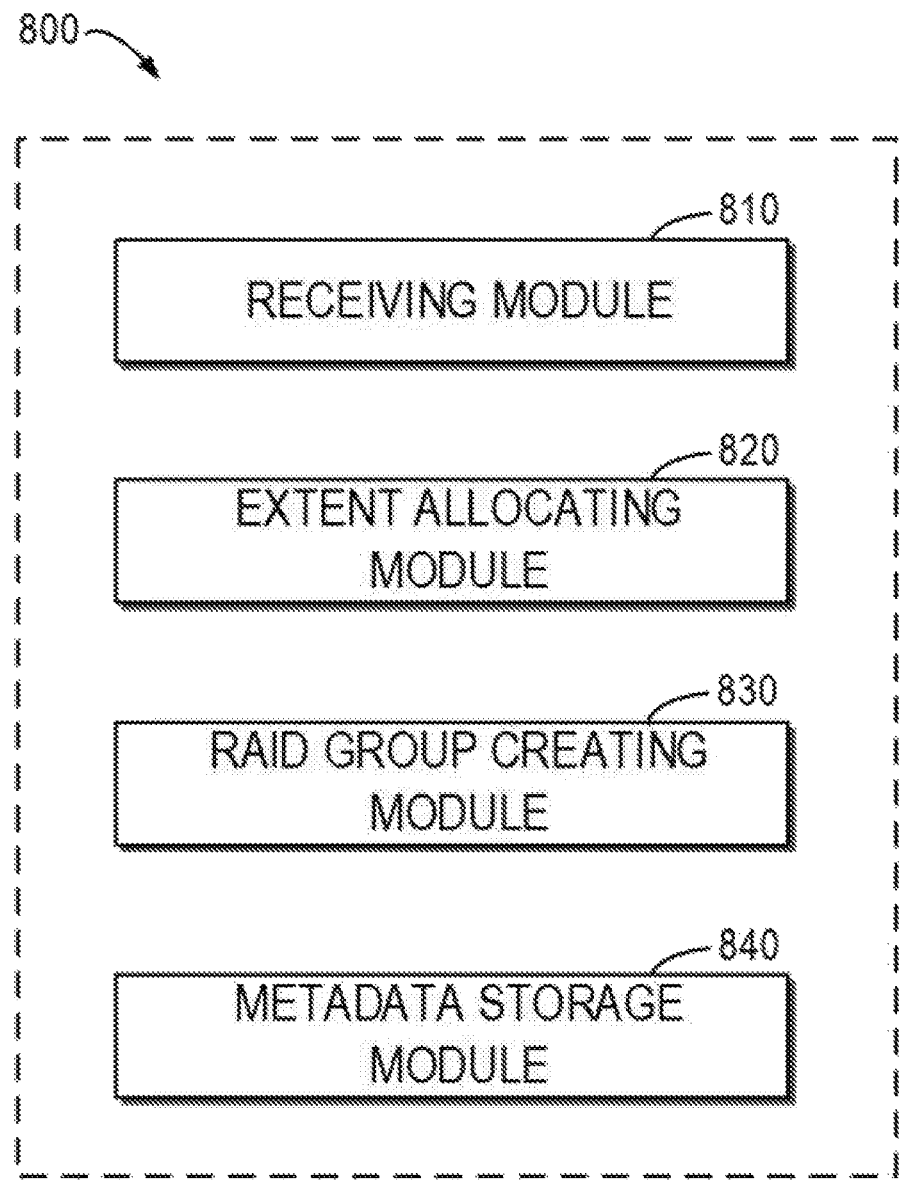
FIG. 8 illustrates a schematic block diagram of a storage management apparatus 800 in accordance with an embodiment of the present disclosure.

FIG. 8 illustrates a schematic block diagram of a storage management apparatus 800 in accordance with an embodiment of the present disclosure. For example, the computing system/server 102 serving as a party of performing storage management in FIG. 1 may be implemented by the apparatus 800. As shown in FIG. 8, the apparatus 800 may comprise a receiving module 810 configured to receive a request for creating a storage space, the request at least including a storage capacity and a RAID configuration of the storage space, the RAID configuration at least indicating a RAID type; an extent allocating module 820 configured to allocate the extent based on the storage capacity; a RAID group creating module 830 configured to create a RAID group for the extent based on the RAID type; and a metadata storing module 840 configured to store metadata of the RAID group in the extent, the metadata indicating the RAID configuration and attributes of a user data region in the extent.

For the sake of clarity, FIG. 8 does not show some optional modules of the apparatus 800. However, it should be understood that various features described above with reference to FIGS. 1-7 are also applicable to the apparatus 800. Moreover, various modules of the apparatus 800 may be hardware modules or software modules. For example, in some embodiments, the apparatus 800 may be partially or completely implemented using software and/or firmware, e.g., implemented as a computer program product embodied on a computer readable medium. Alternatively or additionally, the apparatus 800 may be partially or completely implemented based on hardware, e.g., implemented as an integrated circuit (IC), an application-specific integrated circuit (ASIC), a system on chip (SOC), a field programmable gate array (FPGA), etc. The scope of the present disclosure will not be limited in this aspect.

The present disclosure may be a method, an apparatus, a system and/or a computer program product. The computer program product may include a computer readable medium which carries computer readable program instructions for executing various aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing devices.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on a remote computer or server. In the scenario related to a remote computer, the remote computer may be connected to the user's computer through any type of network, including a local area network (LAN) or a wide area network (WAN), or the remote computer may be connected to an external computer (for example, through the Internet using an Internet Service Provider). In some embodiments, an electronic circuitry, e.g. a programmable logic circuitry, field-programmable gate arrays (FPGA), or programmable logic arrays (PLA) may be personalized using the state information of the computer readable program instructions, and the electronic circuitry may execute the computer readable program instructions to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, when executed via the processor of a computer or other programmable data processing apparatus, create means for implementing the functions/actions specified in one or more blocks of the flowchart and/or block diagrams. These computer readable program instructions may also be stored in a computer readable storage medium that can direct a computer, a programmable data processing apparatus, and/or other devices to function in a particular manner, such that the computer readable storage medium having instructions stored thereon comprises an article of manufacture including instructions which implement aspects of the functions/actions specified in one or more blocks of the flowchart and/or block diagrams.

The computer readable program instructions may also be loaded into a computer, other programmable data processing apparatus or other devices to perform a series of operational steps on the computer, other programmable apparatus or other devices to produce a computer implemented process, such that the instructions which execute on the computer, other programmable apparatus, or other device implement the functions/actions specified in one or more blocks of the flowchart and/or block diagrams.

The flowchart and block diagrams in the Figures illustrate the architecture, functionality, and operation of possible implementations of systems, methods and computer program products according to various embodiments of the present invention. In this regard, each block in the flowchart or block diagrams may represent a module, a segment, or a portion of code, which module, segment, or portion of code comprises one or more executable instructions for implementing the specified logical function(s). It should also be noted that, in some alternative implementations, the functions noted in the block may not occur in the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by dedicated hardware-based systems that perform the specified functions or actions, or by combinations of dedicated hardware and computer instructions.

The descriptions of the various embodiments of the present invention have been presented for the purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical applications or technical improvement over technologies found in the marketplace, or to enable others of ordinary skill in the art to understand the embodiments disclosed herein.

We claim:

1. A method of storage management, comprising:
receiving a request for creating a storage space, the request at least including a storage capacity and a RAID configuration of the storage space, the RAID configuration at least indicating a RAID type;
allocating an extent based on the storage capacity;
creating a RAID group for the extent based on the RAID type; and
storing metadata of the RAID group into the extent, the metadata indicating a configuration of the RAID group and a configuration of a user data region in the extent;
wherein the metadata includes:
first metadata for recording configuration information of a RAID unit in the RAID group, the RAID group including a plurality of RAID units, and
second metadata for recording an extent to be rebuilt amongst extents mapped by the RAID unit; and
wherein storing metadata of the RAID group into the extent comprises:
storing the first metadata in a mirror stripe created for the extent, the mirror stripe being stored at a start of the extent, and
storing the second metadata at an end of the extent, a region between the start and the end of the extent being the user data region.

2. The method of claim 1, wherein the received request for creating a storage space is a request for expanding an existed storage space.

3. The method of claim 1, further comprising:
maintaining a dynamic mapping, the dynamic mapping including at least one of the following:
a first multi-tuple including identification information of the storage space, a storage capacity of the storage space, and a RAID configuration and reference information of the storage space, the reference information indicating a logic block address (LBA) corresponding to the storage space,
a second multi-tuple including a mapping relationship between a logic unit number (LUN) of the storage space and an address of the RAID group, the second multi-tuple including at least one sub-multi-tuple of a same size, and
a third multi-tuple including a mapping relationship between the RAID group of the storage space and the extent.

4. The method of claim 1, wherein at least a portion of the RAID group is formed of magnetic disk drive storage.

5. A method of storage management, comprising:
receiving a request for creating a storage space, the request at least including a storage capacity and a RAID configuration of the storage space, the RAID configuration at least indicating a RAID type;
allocating an extent based on the storage capacity;
creating a RAID group for the extent based on the RAID type;
storing metadata of the RAID group into the extent, the metadata indicating a configuration of the RAID group and a configuration of a user data region in the extent; and
maintaining a dynamic mapping, the dynamic mapping including at least one of the following:
a first multi-tuple including identification information of the storage space, a storage capacity of the storage space, and a RAID configuration and reference information of the storage space, the reference information indicating a logic block address (LBA) corresponding to the storage space,
a second multi-tuple including a mapping relationship between a logic unit number (LUN) of the storage space and an address of the RAID group, the second multi-tuple including at least one sub-multi-tuple of a same size, and
a third multi-tuple including a mapping relationship between the RAID group of the storage space and the extent.

6. The method of claim 5, further comprising:
detecting whether an idle storage unit is present in the second multi-tuple for storing the address of the RAID group;
in response to absence of the idle storage unit in the second multi-tuple, allocating a sub-multi-tuple including a plurality of idle storage units; and
arranging the sub-multi-tuple at an end of the second multi-tuple.

7. The method of claim 5, further comprising:
receiving a reducing request for a storage space to be reduced, the reducing request including indication information for indicating a predetermined RAID group to be reduced;

erasing metadata on an extent corresponding to the predetermined RAID group according to the indication information; and distributing to an extent pool the extent having the metadata erased, the extent pool including a plurality of extents.

8. The method of claim 7, further comprising:
marking the third multi-tuple corresponding to the predetermined RAID group in the dynamic mapping as invalid so as to invalid the predetermined RAID group.

9. The method of claim 7, further comprising:
marking a predetermined storage unit that was used to store the address of the predetermined RAID group in the second multi-tuple of the dynamic mapping, as idle.

10. The method of claim 9, further comprising:
in response to all storage units in a predetermined sub-multi-tuple where the predetermined storage unit locates are all marked as idle, releasing a corresponding relationship of the predetermined sub-multi-tuple and the second multi-tuple so that a storage space in a memory occupied by the predetermined sub-multi-tuple can be used to store other data.

11. A device, comprising:
at least one processing unit; and
at least one memory coupled to the at least one processing unit and storing instructions executable by the at least one processing unit, the instructions, when executed by the at least one processing unit, causing the device to perform acts including:
  receiving a request for creating a storage space, the request at least including a storage capacity and a RAID configuration of the storage space, the RAID configuration at least indicating a RAID type,
  allocating an extent based on the storage capacity,
  creating a RAID group for the extent based on the RAID type, and
  storing metadata of the RAID group into the extent, the metadata indicating a configuration of the RAID group and a configuration of a user data region in the extent;
wherein the metadata includes:
  first metadata for recording configuration information of a RAID unit in the RAID group, the RAID group including a plurality of RAID units, and
  second metadata for recording an extent to be rebuilt amongst extents mapped by the RAID unit; and
wherein storing metadata of the RAID group in the extent comprises:
  storing the first metadata in a mirror stripe created for the extent, the mirror stripe being stored at a start of the extent, and
  storing the second metadata at an end of the extent, a region between the start and the end of the extent being the user data region.

12. The device of claim 11, wherein the received request for creating a storage space is a request for expanding an existed storage space.

13. The device of claim 11, wherein the acts further include:
maintaining a dynamic mapping, the dynamic mapping including at least one of the following:
  a first multi-tuple including identification information of the storage space, a storage capacity of the storage space, and a RAID configuration and reference information of the storage space, the reference information indicating a logic block address (LBA) corresponding to the storage space,
  a second multi-tuple including a mapping relationship between a logic unit number (LUN) of the storage space and an address of the RAID group, the second multi-tuple including at least one sub-multi-tuple of a same size, and
  a third multi-tuple including a mapping relationship between the RAID group of the storage space and the extent.

14. The device of claim 11, wherein at least a portion of the RAID group is formed of magnetic disk drive storage.

15. A device, comprising:
at least one processing unit; and
at least one memory coupled to the at least one processing unit and storing instructions executable by the at least one processing unit, the instructions, when executed by the at least one processing unit, causing the device to perform acts including:
  receiving a request for creating a storage space, the request at least including a storage capacity and a RAID configuration of the storage space, the RAID configuration at least indicating a RAID type,
  allocating an extent based on the storage capacity,
  creating a RAID group for the extent based on the RAID type,
  storing metadata of the RAID group into the extent, the metadata indicating a configuration of the RAID group and a configuration of a user data region in the extent, and
  maintaining a dynamic mapping, the dynamic mapping including at least one of the following:
    a first multi-tuple including identification information of the storage space, a storage capacity of the storage space, and a RAID configuration and reference information of the storage space, the reference information indicating a logic block address (LBA) corresponding to the storage space,
    a second multi-tuple including a mapping relationship between a logic unit number (LUN) of the storage space and an address of the RAID group, the second multi-tuple including at least one sub-multi-tuple of a same size, and
    a third multi-tuple including a mapping relationship between the RAID group of the storage space and the extent.

16. The device of claim 15, wherein the acts further include:
  detecting whether an idle storage unit is present in the second multi-tuple for storing the address of the RAID group;
  in response to absence of the idle storage unit in the second multi-tuple, allocating a sub-multi-tuple including a plurality of idle storage units; and
  arranging the sub-multi-tuple at an end of the second multi-tuple.

17. The device of claim 15, wherein the actions further comprise:
  receiving a reducing request for a storage space to be reduced, the reducing request including indication information for indicating a predetermined RAID group to be reduced;
  erasing metadata on an extent corresponding to the predetermined RAID group according to the indication information; and
  distributing to an extent pool the extent having the metadata erased, the extent pool including a plurality of extent.

18. The device of claim 17, wherein the acts further include:
    marking the third multi-tuple corresponding to the predetermined RAID group in the dynamic mapping as invalid so as to invalid the predetermined RAID group.

19. The device of claim 17, wherein the acts further include:
    marking a predetermined storage unit that was used to store the address of the predetermined RAID group in the second multi-tuple of the dynamic mapping, as idle.

20. The device of claim 19, wherein the acts further include:
    in response to all storage units for a predetermined sub-multi-tuple where the predetermined storage unit locates are all marked as idle, releasing a corresponding relationship of the predetermined sub-multi-tuple and the second multi-tuple so that the storage space in a memory occupied by the predetermined sub-multi-tuple can be used to store other data.

* * * * *